US012683171B2

(12) United States Patent
Gomadam

(10) Patent No.: US 12,683,171 B2
(45) Date of Patent: Jul. 14, 2026

(54) CURRENT COLLECTOR TAB PLACEMENT TO REDUCE BATTERY SHUT DOWN TIME

(71) Applicant: Medtronic, Inc., Minneapolis, MN (US)

(72) Inventor: Parthasarathy M. Gomadam, Plymouth, MN (US)

(73) Assignee: Medtronic, Inc., Minneapolis, MN (US)

( * ) Notice: Subject to any disclaimer, the term of this patent is extended or adjusted under 35 U.S.C. 154(b) by 390 days.

(21) Appl. No.: 17/350,524

(22) Filed: Jun. 17, 2021

(65) Prior Publication Data
US 2022/0407084 A1     Dec. 22, 2022

(51) Int. Cl.
*H01M 4/76*      (2006.01)
*H01M 50/291*    (2021.01)
*H01M 50/403*    (2021.01)

(52) U.S. Cl.
CPC ......... *H01M 4/765* (2013.01); *H01M 50/291* (2021.01); *H01M 50/403* (2021.01)

(58) Field of Classification Search
CPC ..... H01M 50/291; H01M 50/403–406; H01M 4/765

See application file for complete search history.

(56) References Cited

U.S. PATENT DOCUMENTS

2007/0099072 A1*  5/2007  Hennige ............. H01M 50/414
                                                           156/60
2012/0107655 A1    5/2012  Lee 2014/0363713 A1*  12/2014  Schmidt ................ H01M 50/54
                                                             429/246
2017/0092925 A1*  3/2017  Shiu ................... H01M 10/0431
2019/0252732 A1*  8/2019  Park ................... H01M 10/0422
2021/0050637 A1*  2/2021  Kim .................... H01M 10/643
2021/0159478 A1    5/2021  Buiel et al.

FOREIGN PATENT DOCUMENTS

JP        2010111832        5/2010

OTHER PUBLICATIONS

Yao et al., "Tab Design and Failures in Cylindrical Li-ion Batteries," IEEE Access, Mar. 7, 2019, 14 pages.
PCT Search Report and Written Opinion for PCT/US2022/029367 dated Dec. 22, 2022 (12 pages).

* cited by examiner

*Primary Examiner* — Jennifer A Boyd
(74) *Attorney, Agent, or Firm* — Mueting Raasch Group

(57)           ABSTRACT

An electrochemical cell comprising a first electrode separated from a second electrode by a shutdown separator. The first electrode can comprise a first current collector substrate having a first active material composite layered thereon. The second electrode can comprise a second current collector substrate parallel to the first current collector substrate. The second current collector substrate can have a second active material composite layered thereon. The first current collector substrate can have a first current collector tab extending from the first current collector substrate at a position along an axis parallel to a plane defined by the first current collector substrate. The second current collector substrate can have a second current collector tab extending from the second current collector substrate at a same position along the axis as the first current collector tab. A battery including the electrochemical cell and methods for manufacturing the battery are also described.

18 Claims, 6 Drawing Sheets

CURRENT COLLECTOR TAB PLACEMENT TO REDUCE BATTERY SHUT DOWN TIME

FIELD

The present technology is generally related to batteries. More specifically, the present technology relates to current electrode or collector tab placement for improved battery safety.

BACKGROUND

Batteries have at least one pair of electrodes of opposite polarity and, in some designs, have a series of adjacent electrodes of alternating polarity. The current flow between these electrodes is maintained by an electrolyte. Separators are located in the batteries between adjacent electrodes of opposite polarity to prevent direct contact between the oppositely charged electrode plates while freely permitting electrolytic conduction through pores within the separator material. As battery technologies develop, batteries can be capable of ever-increasing power storage densities. Separators can be configured to prevent overheating and thermal runaway caused by battery misuse, short circuiting, or other conditions. For example, shutdown separators can be designed to reduce porosity at a predetermined elevated temperature, to essentially shut down the battery and reduce the likelihood of explosions or other dangerous conditions. However, when the time to reach the predetermined temperature is gradual, the shutdown separator may not cause shutdown quickly enough, and dangerous conditions can still result.

SUMMARY

The techniques of this disclosure generally relate to battery apparatuses.

In one aspect, the present disclosure provides an electrochemical cell comprising a first electrode separated from a second electrode by a shutdown separator. The first electrode comprises a first current collector substrate having a first active material composite layered thereon. The second electrode comprises a second current collector substrate parallel to the first current collector substrate. The second current collector substrate has a second active material composite layered thereon. The first current collector substrate has a first current collector tab extending from the first current collector substrate at a position along an ais parallel to a plane defined by the first current collector substrate. The second current collector substrate has a second current collector tab extending from the second current collector substrate at a same position as the first current collector tab along the axis parallel to the first current collector substrate.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Battery cells comprise electrodes, often arranged in a stacked or jelly rolled configuration. Separators are located between adjacent electrodes of opposite polarity to prevent direct contact between the oppositely charged electrode plates while freely permitting electrolytic conduction through pores within the separator material. These separators can include properties to shut down batteries upon heating up to a particular temperature. For example, separators can include pores that close down when a certain temperature is reached, thereby cutting off ionic current flow, which in turn increases the battery internal resistance to the point of dropping all current flow from the battery. The battery cell therefore is prevented from heating further, limiting further temperature rise and preventing dangerous conditions such as explosions.

The time to perform this shut down determines the temperatures reached. As higher energy and higher power batteries such as the coiled high voltage batteries are designed, it is desirable to further improve safety by reducing the shut down time. Embodiments provide for placement of current collector tabs in a manner that causes temperatures to increase more quickly, thereby reducing the time to shut down the battery. Therefore, while temperature will increase quickly upon an error condition or other thermal abuse, the total amount of time spent at high temperatures will be reduced, and the final high temperature reached may be reduced relative to temperatures that can be seen with the use of available shutdown separators.

Figure 1:
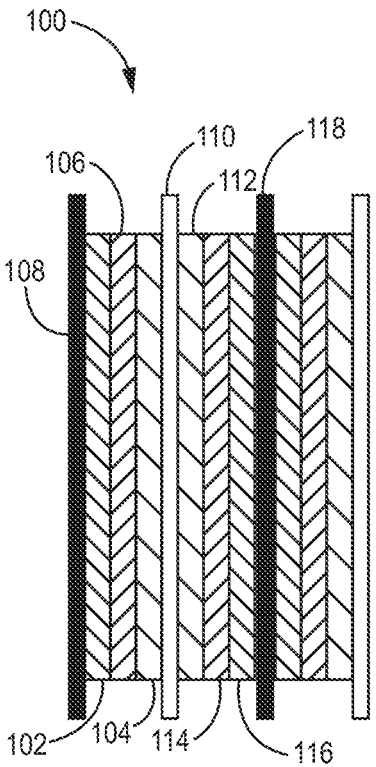
FIG. 1 is a diagram of an example electrochemical cell in accordance with embodiments.

FIG. 1 is a diagram of an example electrochemical cell 100 in accordance with embodiments. The electrochemical cell 100 includes at least one first electrode 102 separated from a second electrode 104 by a shutdown separator 106. The first electrode 102 can comprise a first current collector 108 substrate having a first active material composite layered thereon. The first current collector 108 can be substantially planar, or the first current collector 108 can be curved, although embodiments are not limited thereto. The second electrode 104 can comprise a second current collector 110 substrate parallel to the first current collector 108 substrate. The second current collector 110 substrate can have a second active material composite layered thereon. The second current collector 110 can be substantially planar, although embodiments are not limited to planar current collectors. More than one set of electrodes can be included in the electrochemical cell 100. For example, current collector 110 can have active material disposed thereon to form a third electrode 112. A second shutdown separator 114 can separate third electrode 112 from fourth electrode 116. Fourth electrode 116 can be formed by disposing active material on current collector 118. While FIG. 1 illustrates a planar cell 100 embodiments are not limited thereto. Other embodiments include but are not limited to the cell being coiled or rolled up.

The shutdown separator 106 can be resistant to heat distortion. The shutdown separator 106 shall be porous such that lithium ions can pass through the shutdown separator. The shutdown separator 106 shall include a resin or other material that melts or deforms at high temperatures to close pores of the shutdown separator 106. This pore shutdown shall prevent passage of lithium ions, shutting down the electrochemical cell 100 current to zero or nearly zero. In some examples, a subset of shutdown separators 106 will shut down.

In some examples, the first electrode 102 can be a negative electrode and the second electrode 104 can be a positive electrode. Positive electrodes 104 can include an active material and a sheet-form current collector (e.g., current collector 110) carrying the active material. The positive electrode current collector 110, can typically comprise a metal but is not limited thereto. For the positive electrode 104, 112 active material, various materials can be used. The positive electrode 104 can include a material mixture carried on the current collector 110, the material mixture including a positive electrode active material and a small amount of a binder or a conductive material. Positive electrode 104 active material can include lithium-containing transition metal oxides such as lithium cobalt oxide, lithium nickel oxide, and lithium manganese oxide. The binder material can include polytetrafluoroethylene (PTFE) or rubber materials. Negative electrode 102 can include an active material and a sheet-form current collector 108 carrying the active material. The negative electrode current collector 108 can typically comprise a metal but is not limited thereto. The negative electrode active material can include carbon materials (for example, graphite), a silicon material or silicon alloy, a tin material or a tin alloy, and lithium metal. The lithium metal can include a lithium alloy including metal elements such as aluminum, zinc or magnesium. The negative electrode 102 binder material can include the same or similar material as used in the positive electrode 104 binder material.

Current collectors (e.g., current collector 108 and 110) include current collector tabs, which are coupled, typically by welding, to respective current collectors and then provided outside the battery cell casing so that the electrochemical cell 100 energy can be transferred to an external source. Because current collector tabs are the main path through which electrochemical cell 100 energy flows, current collector tabs are often a principal or main source of heat. Battery designers may attempt to disperse such heat by providing electrochemical cell 100 energy through several current collector tabs or positioning such current collector tabs far apart from each other. If more tabs are used, then the current through each tab is lower, which reduces the local heating rate and causes the shutdown separator to begin shutting down later or more slowly. However, the inventors have discovered that, by minimizing the number of collector tabs used, or by placing current collector tabs closer together, heat can increase more quickly, causing the shutdown separators 106 to shut off current flow more quickly, therefore leading to a smaller overall amount of time at which the battery is at dangerously high temperatures. Accordingly, embodiments provide for increasing local heating rate to minimize the peak temperature reached, and to minimize the shutdown time.

Figure 2:
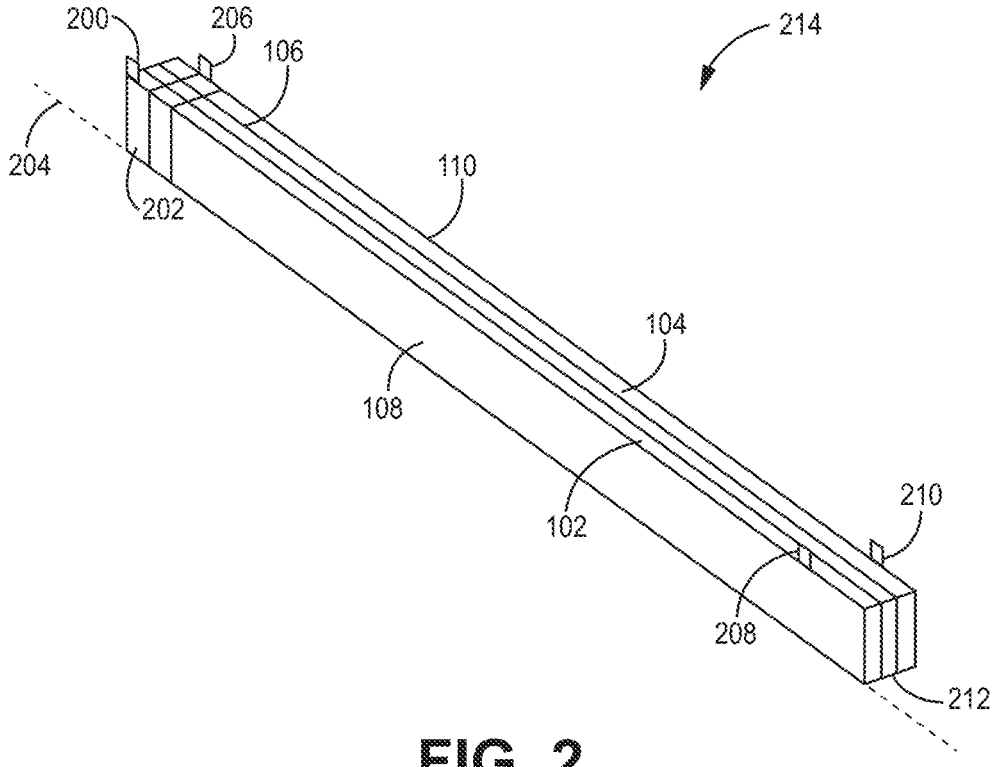
FIG. 2 is a diagram illustrating example current collector tab placement in accordance with embodiments.

FIG. 2 is a diagram illustrating example current collector tab placement in accordance with embodiments. As shown, a first current collector 108 substrate can have a first current collector tab 200 extending from the first current collector 108 substrate at a position 202 along an axis 204 parallel to a plane defined by the first current collector 108 substrate. The second current collector 110 substrate can have a second current collector tab 206 extending from the second current collector 110 substrate at a same position or nearly same position as the first current collector tab 200 along the axis 204 parallel to the first current collector 108 substrate. In examples, the spacing of each of the collector tabs 200, 206 from each other along axis 204 can be expressed in terms of a percentage of a length of the first current collector substrate. For example, the collector tabs 200, 206 can be spaced apart by less than 25% of the length of the first current collector 108 substrate. In one embodiment, the collector tabs 200, 206 can be spaced apart by less than 10% of the length of the first current collector 108. In another embodiment, the collector tabs 200, 206 can be spaced apart by less than 5%, or less than 1% or less than 0.1% of the length of the first current collector 108, or within a minimal manufacturing tolerance from each other. In examples, one edge of each of the collector tabs 200, 206 can be at a same or nearly same position along the axis 204.

Similarly, other current collector tabs can be placed, with sets of current collector tabs being disabled, not used, or disconnected depending on battery user needs. For example, current collector tabs 208 and 210 can be placed at an opposite end 212 of electrochemical cell 214 at same or substantially same positions along the axis 204. In other examples, the current collector tabs 208, 210 can be spaced anywhere along the axis 204, within similar ranges of each other; for example, current collector tab 208 can be spaced less than 25% of the length of the first current collector 108 from current collector tab 210. In an embodiment, the collector tabs 208, 210 can be spaced apart by less than 10% of the length of the first current collector 108. In another embodiment, the collector tabs 208, 210 can be spaced apart by less than 5%, or less than 1% or less than 0.1% of the length of the first current collector 108, or within a minimal manufacturing tolerance from each other. While four example tabs are shown, there can be any number of tabs in any position, and different current collectors can have different numbers of tabs.

Figure 3A:
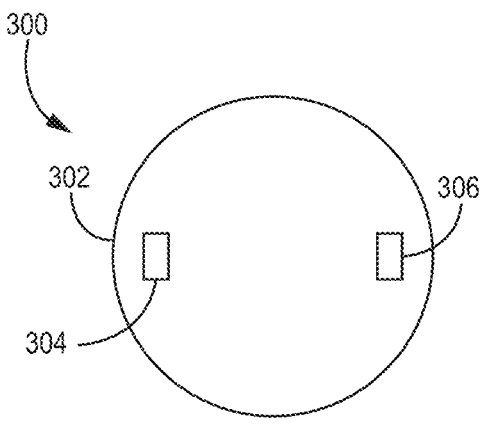
FIG. 3A illustrates a first current collector tab placement within a jelly roll in accordance with embodiments.

In some examples, the electrochemical cell 214 can be rolled in a jelly roll configuration. FIG. 3A illustrates current collector tab placement within a jelly roll 300 in accordance with embodiments. For clarity and simplicity purposes only, all layers of an electrochemical cell are not shown. The shape of the jelly roll may be but is not limited to cylindrical, oblong, flattened cylindrical, flattened oblong, etc. shapes In FIG. 3A, the first current collector tab 304 and the second current collector tab 306 are on an outside surface 302 of the jelly roll 300. In other examples, the first current collector tab 304 and the second collector tab 306 can be together in a middle or interior region of the jelly roll 300. In examples, one of the first current collector tab 304 and the second current collector tab 306 will correspond to a negative current collector for a negative electrode, and the other will correspond to a positive current collector of a positive electrode. In examples, the first current collector tab 304 and the second current collector tab 306 are spaced far apart on the outside or outside surface, middle or interior region of the jelly roll 300.

Figure 3B:
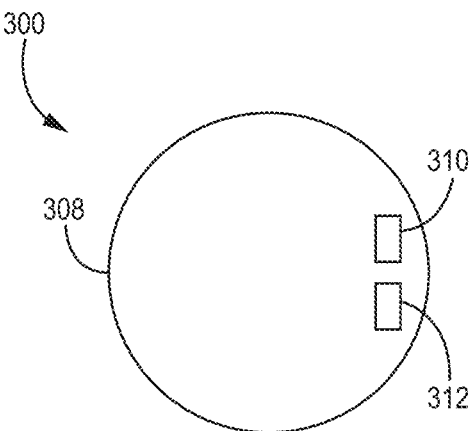
FIG. 3B illustrates a second current collector tab placement within a jelly roll in accordance with embodiments.

FIG. 3B illustrates a second alternative current collector tab placement within a jelly roll 300 in accordance with embodiments. In FIG. 3B, the first current collector tab 310 and the second current collector tab 312 are close together on an outside surface 308 or middle of the jelly roll 300.

Figure 3C:
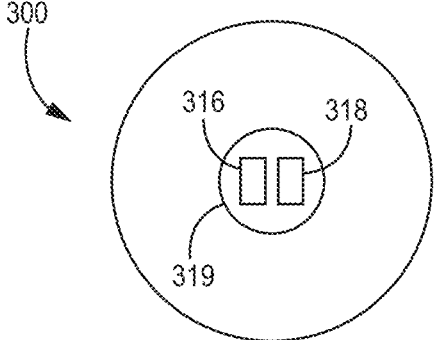
FIG. 3C illustrates a third current collector tab placement within a jelly roll in accordance with embodiments.

FIG. 3C illustrates alternative current collector tab placement within a jelly roll in accordance with embodiments. In FIG. 3C, the first current collector tab 316 and the second current collector tab 318 are at an interior portion 319 of the jelly roll 300. In examples, one of the first current collector tab 316 and the second current collector tab 318 will correspond to a negative current collector for a negative electrode, and the other will correspond to a positive current collector of a positive electrode. In examples, all six of the current collector tabs 304, 306, 310, 312, 316 and 318 or any other number of tabs including different numbers of tabs for the two electrodes can be included. In any of the examples any of the tabs could be disabled, disconnected, or otherwise turned off using a disabling mechanism, wherein the disabling mechanism can include software, firmware or hardware components.

Figure 4:
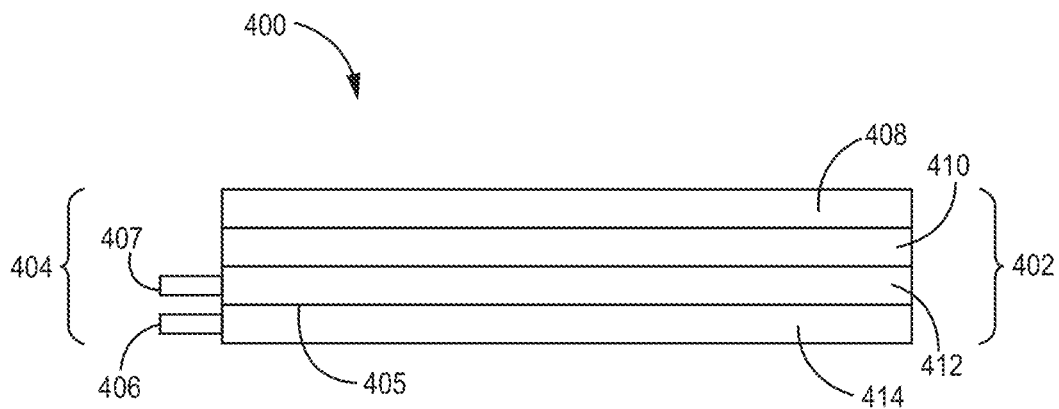
FIG. 4 illustrates current collector tab placement within a stacked plate in accordance with embodiments.

FIG. 4 illustrates an electrochemical cell 400 in a stacked plate configuration. In some examples, the electrochemical cell 100 (FIG. 1) can be in a stacked plate configuration at least somewhat similar to the electrochemical cell 400, having a first end 402 and a second end 404. The plates 408, 410, 412, 414 may be planar, curved or any other regular irregular shape. The first current collector tab 406 and the second current collector tab 407 can be a same end (e.g., first end 402 and second end 404) of the stacked plate configuration. A separator 405 shall be included between each electrode of the electrochemical cell 400. Any number of tabs may be included for a given plate 408, 410, 412, 414 couple and any number of tabs may be included for other plate couples.

Figure 5:
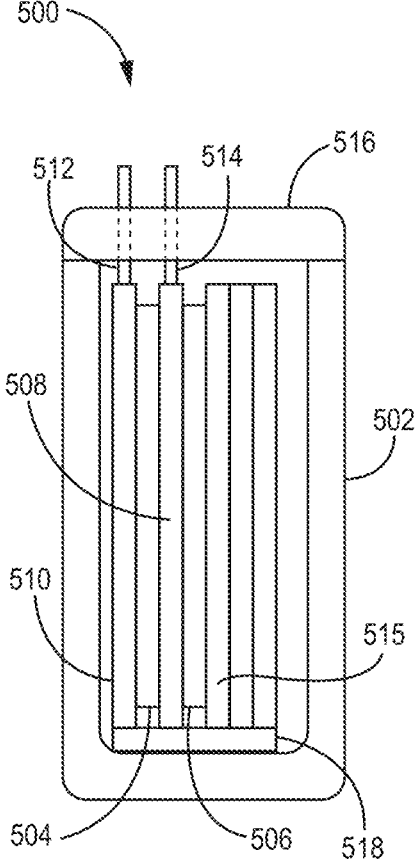
FIG. 5 illustrates a battery in accordance with embodiments.

FIG. 5 illustrates a battery 500 in accordance with some embodiments. The battery 500 can include a battery housing 502. The battery housing 502 can be tubular although embodiments are not limited thereto. An electrochemical cell can be inserted into the battery housing 502, having components similar to those shown in FIG. 1. For example, the electrochemical cell can include a first electrode 504 separated from a second electrode 506 by a shutdown separator 508. The first electrode 504 can comprise a planar first current collector 510 substrate having a first active material composite layered thereon. The second electrode comprising a planar second current collector 515 substrate parallel to the first current collector 510 substrate. The second current collector 515 substrate can have a second active material composite layered thereon.

The first current collector substrate can have a first current collector tab 512 extending from the first current collector 510 substrate at a position along an axis parallel to a plane defined by the first current collector substrate. The second current collector 515 substrate can have a second current collector tab 514 extending from the second current collector 515 substrate at a same position as the first current collector tab 512 along the axis parallel to the first current collector 510 substrate. The battery 500 can further include a top cover 516. The battery 500 can further include an insulator 518 at least at the bottom to insulate the electrochemical cell from the battery housing 502. The battery 500 can be a lithium metal or lithium-ion battery although other battery types can be used.

The first current collector tab 512 and the second current collector tab 514 can be provided in a variety of ways according to different embodiments. For example, one, some or all the current collector tabs shown or not shown in FIG. 5 can be coupled to feedthroughs (partially illustrated with dashed lines in FIG. 5) through the top cover 516. In at least these embodiments, the first current collector tab 512 and the second current collector tab 514 will be coupled to different feedthroughs to prevent shorting. In some embodiments, at most one of the first current collector tab 512 and the second current collector tab 514 can be coupled by welding, for example, the battery housing 502. In some examples, one of the first current collector tab 512 and the second current collector tab 514 will be coupled to a feedthrough and the other can be coupled to the battery housing 502. Each electrode in an electrode couple may have any number of tabs and the other electrode couples in the housing may have any number of tabs.

Figure 6:
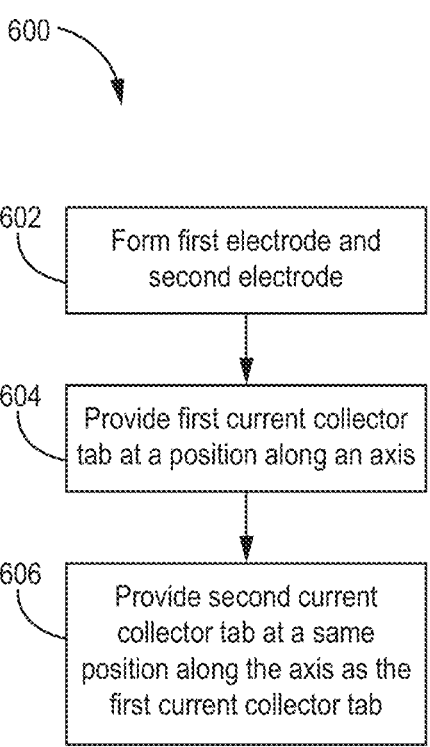
FIG. 6 is a flow diagram of a method for manufacturing an electrochemical cell in accordance with embodiments.

FIG. 6 is a flow diagram of a method 600 of manufacturing an electrochemical cell 100 in accordance with embodiments. Reference is made to elements of the electrochemical cell 100 described above with reference to FIGS. 1-5. The method 600 can begin with operation 602 with forming a first electrode 102 separated from a second electrode 104 by a shutdown separator 106. The first electrode 102 can be formed by disposing a first active material composite on a planar first current collector 108 substrate. The second electrode 104 can be formed by disposing a second active material composite on a planar second current collector 110 substrate parallel to the first current collector 108 substrate.

The method 600 can continue with operation 604 by providing a first current collector tab 200 at the first current collector 108 substrate at a position along an axis parallel to a plane defined by the first current collector 108 substrate. The method can continue with operation 606 by providing a second current collector tab 206 at the second current collector 110 substrate at a same position as the first current collector tab 200 along the axis parallel to the first current collector 108 substrate.

The method 600 can further comprise rolling the first electrode, shutdown separator and second electrode in a jelly roll configuration. The first current collector tab and the second current collector tab can be provided proximate each other at an outside portion or outside surface of the jelly roll configuration or proximate each other at an inside portion of the jelly roll configuration or proximate each other at a middle or interior portion of the jelly roll configuration. In other examples, the electrochemical cell can be provided in a stacked plate configuration having a first end and a second end, and the method 600 can include providing the first current collector tab and the second current collector tab on a same end of the stacked plate configuration. Additional current collector tabs can be provided at each of the first current collector and the second collector, in pairs such that each current collector tab of a pair is at a same position along the axis parallel to the first current collector substrate. The method 600 can include selectively disabling, turning off or disconnecting pairs of current collector tabs. In other examples, at least one pair of current collector tabs will not be included, and only one pair of current collector tabs will be present. In other examples, any number of tabs may be present including unequal numbers for the two electrodes.

Various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, the techniques of this disclosure may be performed by a combination of units or modules associated with, for example, a medical device.

What is claimed is:

1. An electrochemical cell comprising:
a first electrode separated from a second electrode by a shutdown separator, the first electrode comprising a first current collector substrate having a first active material composite layered thereon, the second electrode comprising a second current collector substrate parallel to the first current collector substrate, the second current collector substrate having a second active material composite layered thereon;
the first current collector substrate having a first current collector tab extending from the first current collector substrate at a position along an axis parallel to a plane defined by the first current collector substrate; and
the second current collector substrate having a second current collector tab extending from the second current collector substrate, wherein the second current collector tab is offset from the first current collector tab along the axis parallel to the first current collector substrate by less than 0.1% relative to a length of the first current collector substrate.

2. The electrochemical cell of claim 1, wherein at least one of the first current collector substrate and the second current collector substrate is planar.

3. The electrochemical cell of claim 1, wherein at least one of the first current collector substrate and the second current collector substrate is curved.

4. The electrochemical cell of claim 1, wherein the electrochemical cell is rolled in a jelly roll configuration.

5. The electrochemical cell of claim 4, wherein the first current collector tab and the second current collector tab are on an outside surface of the jelly roll configuration.

6. The electrochemical cell of claim 4, wherein the first current collector tab and the second current collector tab are in an interior region of the jelly roll configuration.

7. The electrochemical cell of claim 4, further comprising other current collector tabs at different positions within the jelly roll configuration.

8. The electrochemical cell of claim 1, wherein the electrochemical cell is in a stacked plate configuration having a first end and a second end, and wherein the first current collector tab and the second current collector tab are on a same end of the stacked plate configuration.

9. The electrochemical cell of claim 8, wherein at least one plate of the stacked plate configuration is planar.

10. The electrochemical cell of claim 8, wherein at least one plate of the stacked plate configuration is curved.

11. The electrochemical cell of claim 1, wherein the first electrode is a negative electrode and the second electrode is a positive electrode.

12. A battery comprising:
a battery housing; and
an electrochemical cell within the battery housing, the electrochemical cell comprising:
a first electrode separated from a second electrode by a shutdown separator, the first electrode comprising a first current collector substrate having a first active material composite layered thereon, the second electrode comprising a second current collector substrate parallel to the first current collector substrate, the second current collector substrate having a second active material composite layered thereon,
the first current collector substrate having a first current collector tab extending from the first current collector substrate at a position along an axis parallel to a plane defined by the first current collector substrate, and
the second current collector substrate having a second current collector tab extending from the second current collector substrate, wherein the second current collector tab is offset from the first current collector tab along the axis parallel to the first current collector substrate by less than 0.1% relative to a length of the first current collector substrate.

13. The battery of claim 12, wherein at least one of the first current collector substrate and the second current collector substrate is planar.

14. The battery of claim 12, wherein at least one of the first current collector substrate and the second current collector substrate is curved.

15. The battery of claim 12, wherein the electrochemical cell is rolled in a jelly roll configuration and the battery housing is a tubular battery housing.

16. The battery of claim 15, wherein the first current collector tab and the second current collector tab are on an outside surface of the jelly roll configuration.

17. The battery of claim 15, wherein one of the first current collector tab and the second current collector tab are coupled to the battery housing and the other is coupled to a feedthrough.

18. The battery of claim 15, wherein both of the first current collector tab and the second current collector tab are coupled to separate feedthroughs.

* * * * *